(12) United States Patent
Furukawa

(10) Patent No.: US 6,661,198 B2
(45) Date of Patent: Dec. 9, 2003

(54) CIRCUIT FOR ADJUSTING CHARGING RATE OF CELLS IN COMBINATION

(75) Inventor: Kimihiko Furukawa, Hirakata (JP)

(73) Assignee: Sanyo Electric Co., LTD, Moriguchi (JP)

( * ) Notice: Subject to any disclaimer, the term of this patent is extended or adjusted under 35 U.S.C. 154(b) by 0 days.

(21) Appl. No.: 10/175,280

(22) Filed: Jun. 20, 2002

(65) Prior Publication Data

US 2002/0196000 A1 Dec. 26, 2002

(30) Foreign Application Priority Data

Jun. 22, 2001 (JP) .................................. 2001-189430

(51) Int. Cl.⁷ .................................................. H02J 7/00
(52) U.S. Cl. ........................................ 320/118; 320/116
(58) Field of Search .................................. 320/118, 116, 320/124, 127, 117, 119; 307/66

(56) References Cited

U.S. PATENT DOCUMENTS 3,765,311 A * 10/1973 Nobusawa ................... 396/252
6,081,095 A * 6/2000 Tamura et al. .............. 320/118

* cited by examiner

*Primary Examiner*—Lawrence Luk
(74) *Attorney, Agent, or Firm*—Armstrong, Westerman & Hattori, LLP

(57) ABSTRACT

The invention provides a charging rate adjusting circuit for a cell combination 1 comprising cell modules 11 each comprising one or a plurality of cells and connected in series and adapted to uniformize the cell modules 11 in charging rate. The adjusting circuit comprises a pair of discharge lines 12, 13 extending from opposite electrodes of each cell module 11, a discharge resistor 2 and an on-off switch 3 provided between the discharge lines 12, 13, a timer circuit 4 comprising a CR circuit for feeding a control signal to a gate of the on-off switch 3, and a photocoupler 5 for initiating the circuit 4 into operation in response to a discharge command.

7 Claims, 3 Drawing Sheets

CIRCUIT FOR ADJUSTING CHARGING RATE OF CELLS IN COMBINATION

FIELD OF THE INVENTION

The present invention relates to a circuit for adjusting the charging rate of cells in combination which have a high voltage, for example, for use as a power source for drive motors for electric motor vehicles such as hybrid cars. The term "charging rate" as used herein means the percentage to which the cells in combination are charged relative to the full capacity thereof.

BACKGROUND OF THE INVENTION

Power sources conventionally mounted in electric motor vehicles, such as hybrid cars, for drive motors comprise secondary cells connected in series for use in combination. Since combinations of such cells need to produce a high voltage usually of 200 to 300 V, for example, 60 to 80 lithium secondary cells each having an output of about 3.6 V are connected in series, or about 200 NiMH secondary cells each having an output of about 1.2 V are connected in series for use in combination.

It is desired that all the secondary cells in combination be equivalent in charged state. Suppose one secondary cell is 70% in charging rate, and another secondary cell is 50% in charging rate. In this case, the amount of electricity chargeable into these cells in combination is 30% which corresponds to the amount of charge for the cell with the charging rate of 70% when it is to be charged to the full. If the two cells are charged to an amount in excess of 30%, the secondary cell with the charging rate of 70% will be charged more than 100% to become greatly shortened in life. Consequently the combination of cells is also shortened in life. Accordingly, it is practice to monitor the voltages of the individual cells in combination using a voltage monitoring device having the construction of FIG. 4. In the case of the illustrated device, a plurality of cells are connected in series to provide a cell module 11, and such cell modules 11 are connected in series to provide a cell combination 1.

Voltage detecting lines extend from the opposite terminals of the combination 1 and from the points of connection between the cell modules 11 and are connected to a voltage detecting circuit 7. The voltages of the cell modules 11 detected by the circuit 7 are fed to an entire control circuit 8. The temperature of the cells is detected by a temperature sensor circuit 81, and the current flowing through the cells is detected by a current sensor circuit 82. The results of detection are fed to the entire control circuit 8, which calculates the amounts of electricity remaining in the cells and checks the cells for abnormalities based on the input data. The result of monitoring is sent to a control system (not shown) through a communication line. Although the voltage of nickel-hydrogen secondary cells can be monitored in groups of 5 to 10 cells, lithium secondary cells are checked for voltage individually because overcharging or overdischarging leads to a markedly shortened life.

Variations in the amount of electricity remaining in the secondary cells in combination are dependent on the efficiency (charge-discharge efficiency) of the individual cells. For example, suppose the secondary cells in combination are all 100% in charge efficiency and 99.0 to 99.5% in discharge efficiency. If the cells are charged at 10 Ah, charge of 10 Ah is stored in each cell. When the cells are subsequently discharged at 10 Ah, charge of 10.1 Ah (=10 Ah/0.990) is delivered from the cell with a discharge efficiency of 99.0%, and charge of 10.05 Ah (=10 Ah/0.995) is delivered from the cell with a discharge efficiency of 99.5%. Charge which is 0.05 Ah greater will then remain in the cell with the higher discharge efficiency of 99.5%. Accordingly, the amount of remaining electricity varies from cell to cell owing to repetition of charge and discharge. Especially in the case of lithium ion secondary cells which are exceedingly high in charge-discharge efficiency, slight variations in charge-discharge efficiency result in a pronounced tendency for the cells to vary in the amount of remaining electricity.

To overcome this problem, it has been proposed to discharge secondary cells having a greater amount of charge with use of a discharge resistor and thereby give them the same amount of remaining electricity as those of smaller amount of charge (JP-A No. 8-19188/1996, No. 10-322925/1998, etc.). FIG. 5 shows a basic circuit for practicing this method. The illustrated circuit is connected to each cell module 11 of a cell combination 1. When a photocoupler 54 is turned on, an on-off switch 31 comprising a MOSFET is closed, causing a current to flow from the cell module 11 to a discharge resistor 21, whereby the charging rate of the cell module 11 can be lowered. Accordingly, with a voltage monitoring device as shown in FIG. 4, all the cell modules 11 can be made equivalent in charging rate within a specified range by measuring the charging rate of each cell module 11, specifying the cell module(s) 11 of high charging rate based on the measurements, turning on the photocoupler 11 connected to each module 11 of high rate and reducing the module 11 in charging rate.

The motor vehicle control system is adapted to operate when the ignition switch is on, and only operations involving very small current consumption are allowed while the ignition switch is off to thereby minimize the power consumption of the lead battery. This is because the lead battery needs to have electric power remaining therein in an amount required for starting up the engine when the ignition switch is thereafter turned on.

Since the circuit of FIG. 5 operates utilizing the voltage of the cell module 11, the control signal for operating the on-off switch 31 needs to be electrically insulated, so that the circuit has the photocoupler 54. For the circuit to effect a sustained discharge, the photocoupler 54 must be held on. Because electric motor vehicles are in a running state (with the ignition switch on) for a considerably shorter period of time than when the vehicle is in a standby state (with the ignition switch off), discharging a cell module of considerable capacity within a limited period of time requires a discharge at a great current value by giving the discharge resistor 21 as low a resistance value as possible. This entails the problem of how to dissipate the heat of the discharge resistor 21.

FIG. 6 shows a circuit therefore proposed (see JP-A No. 10-322925/1998). This circuit has a flip-flop circuit 9 for holding an on-off switch 31 on or off. The switch is held on or off from outside using a first photocoupler 55 for an on state, and a second photocoupler 56 for an off state. Accordingly, discharging can be sustained with the voltage of the cell module 11 even when the drive current for the photocouplers 55, 56 is absent, or a continued discharge can be effected even if the ignition switch is off. Thus, discharging can be continued for a long period of time to diminish the discharge current.

The circuit of FIG. 6 is smaller than the circuit of FIG. 5 in power consumption and is advantageous for providing a smaller device. With the circuit of FIG. 6, the control system connected to the two photocouplers 55, 56 is periodically initiated into operation for monitoring the state of discharge. For example, in the case where the monitoring time is 10 seconds and the system is started up at an interval of 30 minutes, the power consumption of the control system is 1/180 to diminish the depletion of lead battery more effectively than is the case with the circuit of FIG. 5.

However, the circuit of FIG. 6 operates on condition that instructions are given to the first and second photocouplers 55, 56 periodically, so that when the power supply to the control system is discontinued, for example, for maintenance, an input signal for cutting off the flip-flop circuit 9 is no longer available, hence the problem that the cell module 11 is discharged continuously until the capacity becomes nearly zero.

SUMMARY OF THE INVENTION

An object of the present invention is to provide a charging rate adjusting circuit for automatically discontinuing discharging of cells in combination upon lapse of a predetermined period of time after the start of the discharge even if power supply to the control system is stopped, for example, for the maintenance of the system to thereby solve the problem that the cell module will be continuously discharged almost to the approximate zero capacity.

The present invention provides a charging rate adjusting circuit for a cell combination comprising cell modules connected in series and each comprising one or a plurality of cells, the circuit being adapted to discharge the specified cell module or modules among the cell modules in response to a discharge command from a control system. The circuit comprises a discharge circuit connected to opposite electrodes of each of the cell modules, and a control circuit for controlling the operation of the discharging circuit. The control circuit comprises opening-closing means for opening or closing the discharge circuit, and control means for preparing a control signal for changing the opening-closing means from an open state to a closed state in response to a discharge command, holding the control signal for a predetermined period of time and feeding the control signal to the opening-closing means.

With the charging rate control circuit of the present invention, the opening-closing means of the control circuits for all the cell modules are usually in an open state, whereby all the discharge circuits are held open. Accordingly, none of the cell modules are discharged. When one of the cell modules is found to have a high charging rate by a voltage monitoring device, a discharge command is given to the cell module by a control system.

When the discharge command is input to the control circuit of the cell module, the control circuit prepares a control signal for changing the opening-closing means from the open state to the closed state, holds the control signal for a predetermined period of time and feeds the signal to the opening-closing means. Consequently, the opening-closing means is given the control signal for changing this means from the open state to the closed state for the predetermined period of time. The opening-closing means therefore holds the discharge circuit closed for the predetermined period of time, and opens the discharge circuit upon lapse of the predetermined period. As a result, the cell module is discharged over the predetermined period of time. The discharge command is repeatedly given until the cell module becomes approximately equivalent to the other cell modules in charging rate. In this way, all the cell modules are uniformized in charging rate within a specified range.

If the supply of power to the control system is interrupted, for example, for maintenance, with the opening-closing means held closed, the control signal to the opening-closing means becomes no longer held and disappears upon lapse of the predetermined period of time, with the result that the opening-closing means opens the discharge circuit to automatically discontinue the discharge.

Stated specifically, the discharge circuit comprises a pair of discharge lines 12, 13 extending from the opposite electrodes of the cell module, and a discharge resistor 2 provided between the pair of discharge lines 12, 13. When the discharge circuit is closed, current flows through the discharge resistor 2 to discharge the cell module.

Stated specifically, the opening-closing means of the control circuit comprises an on-off switch 3 connected in series with the discharge resistor 2, and the on-off switch 3 changes from the open state to the closed state in response to a closing control signal from the control means. On the other hand, the switch 3 changes from the closed state to the open state in response to an opening control signal from the control means. The closing control signal received by the on-off switch 3 closes the discharge circuit to discharge the cell module. On the other hand, the opening control signal received by the switch 3 opens the discharge circuit to discontinue the discharge of the cell module.

Further stated specifically, the control means of the control circuit comprises a capacitance element chargeable with the electric power of the cell module and thereafter dischargeable to apply a voltage serving as the closing control signal to the on-off switch approximately for a specified period of time, and a control element for connecting the capacitance element to the cell module in response to the discharge command to charge the capacitance element. With this specific construction, the discharge command given to the control element connects the capacitance element to the cell module, and the capacitance element is charged with the power of the cell module. The capacitance element is thereafter discharged to apply a voltage serving as the closing control signal to the on-off switch 3 to close the switch 3. As a result, a discharge of the cell module is started. When the voltage of the capacitance element drops due to the discharge, the voltage serving as the closing control signal is no longer applied to the on-off switch 3 to open the switch 3.

Further stated specifically, the control means of the control circuit comprises a control signal generating circuit capable of generating the closing control signal with the electric power of the cell module over the predetermined period of time and feeding the closing control signal to the on-off switch, and a control element for initiating the control signal generating circuit into operation in response to the discharge command. With this specific construction, the discharge command given to the control element initiates the control signal generating circuit into operation, which generates a closing control signal with the electric power from the cell module over the predetermined period of time and feeds the signal to the on-off switch 3. This closes the switch 3, starting the discharge of the cell module. Upon lapse of the predetermined period of time, the closing control signal disappears, and the switch 3 is opened to discontinue the discharge of the cell module.

The charging rate adjusting circuit of the present invention described is so adapted that even when the supply of power to the control system is interrupted while the charging rate is being adjusted to uniformize the cell modules in charging rate, the discharge is automatically discontinued upon lapse of the predetermined period of time after the start of discharge. This obviates the likelihood that the cell module will be continuously discharged almost to zero capacity.

DETAILED DESCRIPTION OF EMBODIMENTS

Figure 1:
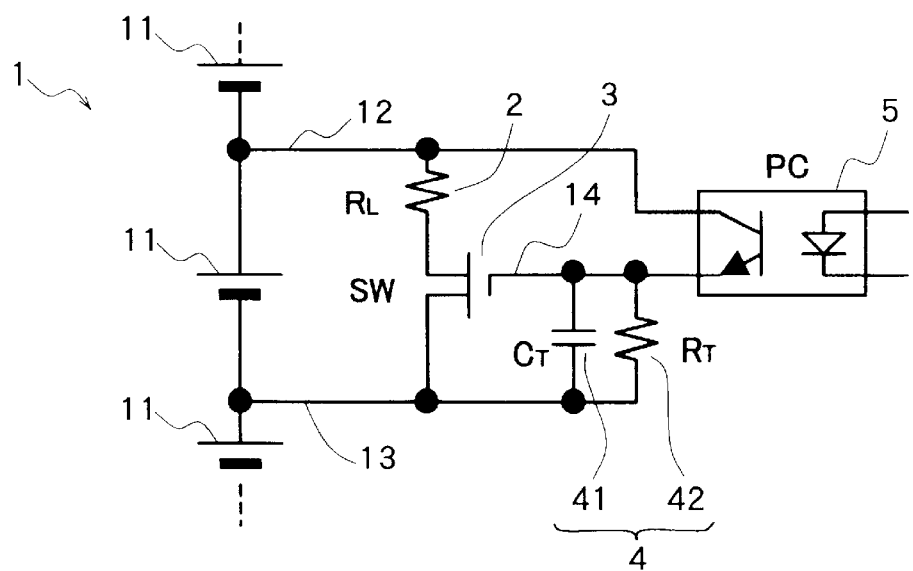
FIG. 1 is a circuit diagram showing a first embodiment of the invention.

Embodiments of the present invention will be described below in detail with reference to the drawings.

Embodiment 1

This embodiment, i.e., a charging rate adjusting circuit, is adapted for use with a cell combination 1 comprising cell modules 11 each comprising a plurality of secondary cells and connected in series. In response to a discharge command given to the specified module among the cell modules 11 by a control system (not shown), the circuit discharges the cell module 11.

A pair of discharge lines 12, 13 extend from opposite electrodes of each cell module 11, and a discharge resistor 2 of relatively low resistance value and an on-off switch 3 comprising a MOSFET are connected between the discharge lines 12, 13 to provide a discharge circuit. When the switch 3 is closed, current flows from the cell module 11 to the discharge resistor 2 through the discharge circuit to discharge the module 11. The secondary side of a photocoupler 5 is connected between the discharge line 12 and a control signal line 14 extending from a gate of the switch 3. A timer circuit 4 comprising a capacitor 41 and a resistor 42 is connected between the control signal line 14 and the other discharge line 13.

Usually, the photocoupler 5 is off, the on-off switch 3 is open, and the cell module 11 is not discharged. When a discharge command (high) is input to the primary side of the specified one of photocouplers 5, the secondary side of the photocoupler 5 conducts, providing a circuit extending from the module 11 to the discharge line 13 via the discharge line 12, photocoupler 5 and timer circuit 4 and returning to the module 11 to instantaneously charge the capacitor 41 of the timer circuit 4.

The capacitor 41 of the timer circuit 4 thereafter discharges, whereby a control signal in excess of a predetermined voltage value is applied to the gate of the on-off switch 3 via the control signal line 14 to thereby close (turn on) the on-off switch 3. This closes the discharge circuit extending from the cell module 11 to the discharge line 13 via the discharge line 12, discharge resistor 2, on-off switch 3 and returning to the module 11 to start to discharge the cell module 11 by the discharge resistor 2. After the discharge command to the photocoupler 5 changes from high to low, the output voltage of the capacitor 41 holds the switch 3 closed to continue the discharge.

When the voltage of the control signal for the on-off switch 3 thereafter drops below a predetermined value due to the progress of discharge of the capacitor 41 of the timer circuit 4, the switch 3 is opened (turned off), consequently discontinuing the discharge of the cell module 11 by the discharge resistor 2. The period of time the switch 3 is held closed depends on the time constant of the timer circuit 4.

When MOSFET is used as the switch 3, the current flowing into the gate is usually very small, so that the switch can be held closed for several tens of minutes even if the capacitor 41 used has a small capacity. Theoretically, the timer circuit 4 need not include the resistor 42, but the provision of the resistor 42 makes it possible to accurately define the holding time.

While the voltages of the cell modules 11 are being monitored periodically (e.g., once every 30 minutes), the discharge command is repeatedly given to the specified cell module 11 of high charging rate, with the result that all the cell modules 11 are made uniform in charging rate within a specified range.

Even if the supply of power to the control system connected to the photocoupler 5 is discontinued, with the on-off switch 3 closed, for example, for maintenance, the voltage drop of the capacitor 41 automatically opens the switch 3 to discontinue discharging. This obviates the likelihood that the cell module will be continuously discharged nearly to zero capacity.

Second Embodiment

Figure 2:
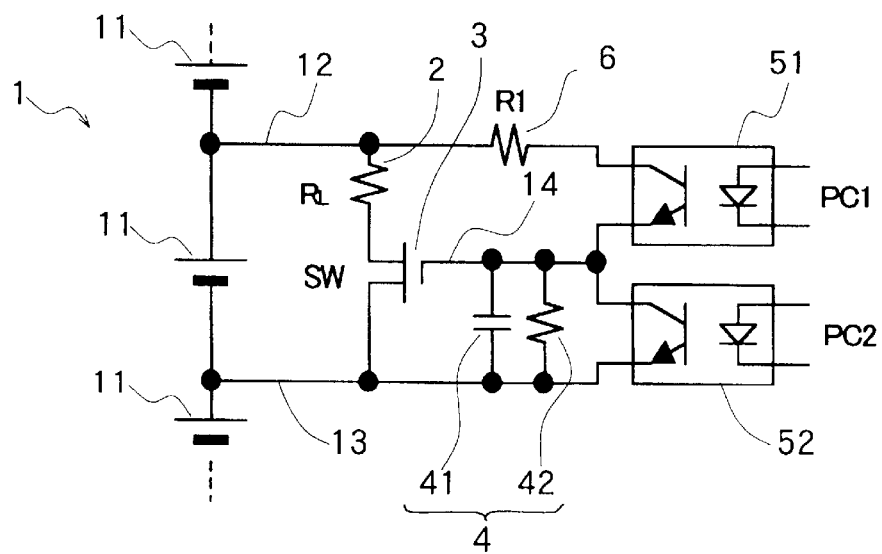
FIG. 2 is a circuit diagram showing a second embodiment of the invention.

This embodiment, i.e., another charging rate adjusting circuit for cells in combination, is an improvement in the charging rate adjusting circuit of the first embodiment. As shown in FIG. 2, a first photocoupler 51 for closing the on-off switch 3 is connected between the discharge line 12 and the control signal line 14, and a second photocoupler 52 for opening the on-off switch 3 is connected between the control signal line 14 and the other discharge line 13. The discharge line 12 is provided with a short-circuit preventing resistor 6 at an intermediate portion thereof.

With this charging rate adjusting circuit, the discharge of the cell module 11 can be started by closing the on-off switch 3 by a discharge command to the first photocoupler 51, and the discharge of the cell module 11 can be discontinued by opening the switch 3 by a discharge stop command to the second photocoupler 52. The short-circuit preventing resistor 6 serves to prevent the cell module 11 from short-circuiting in the event of the first and second photocouplers 51, 52 conducting at the same time.

Even if the supply of power to the control system connected to the photocoupler 5 is discontinued, with the on-off switch 3 closed, for example, for maintenance, the voltage drop of the capacitor 41 automatically opens the switch 3 to discontinue discharging. This obviates the likelihood that the cell module will be continuously discharged nearly to zero capacity.

Third Embodiment

Figure 3:
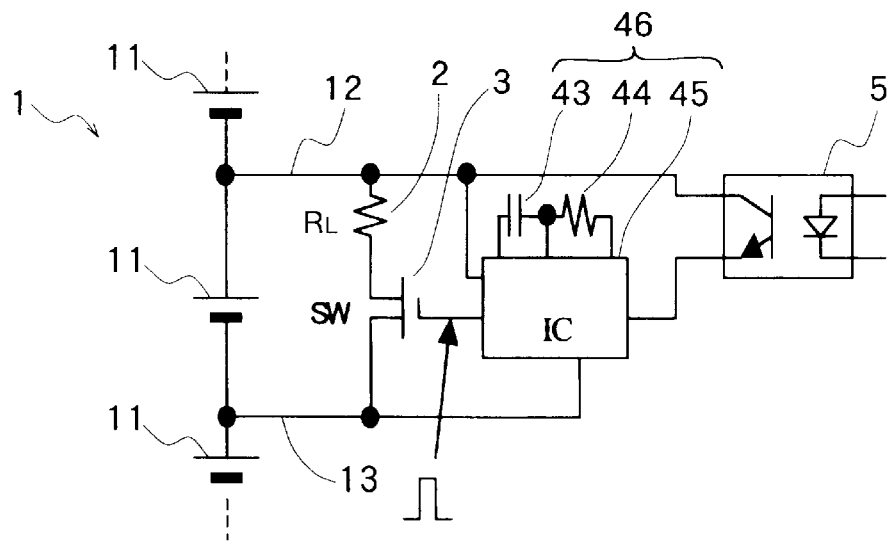
FIG. 3 is a circuit diagram showing a third embodiment of the invention.
Figure 4:
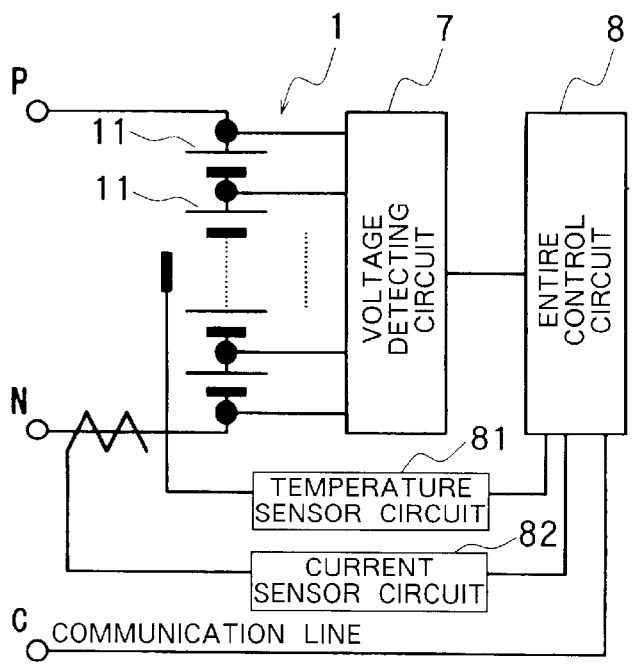
FIG. 4 is a block diagram of a voltage monitoring device.
Figure 5:
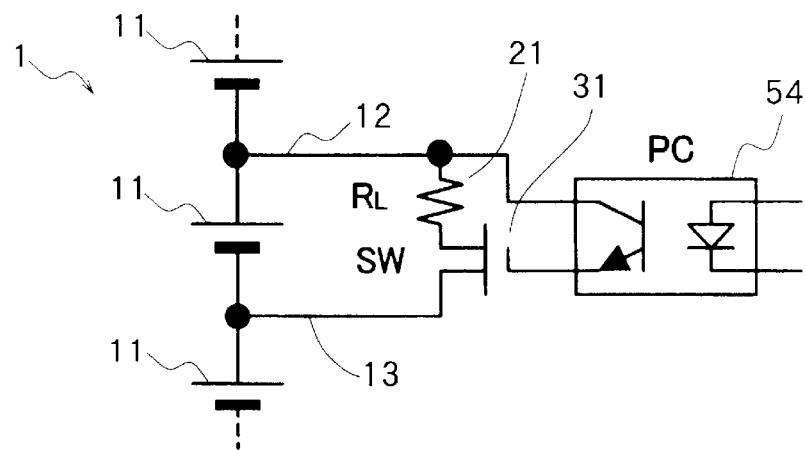
FIG. 5 is a diagram showing a conventional charging rate adjusting circuit.
Figure 6:
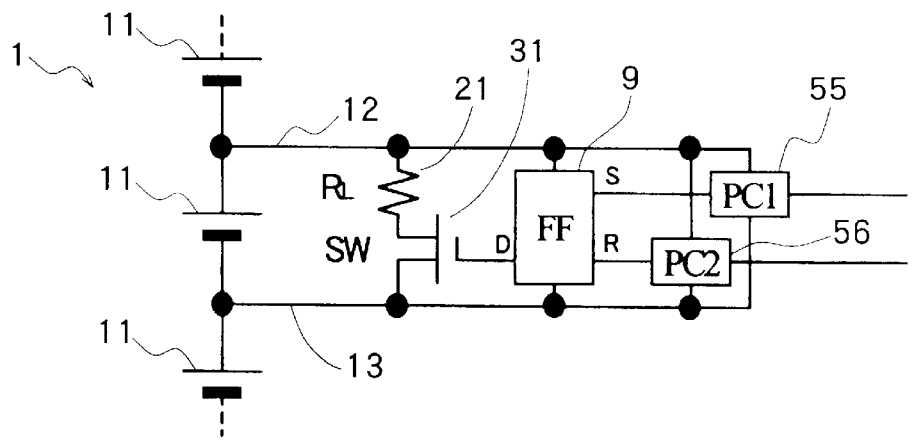
FIG. 6 is a diagram showing another conventional charging rate adjusting circuit.

As shown in FIG. 3, this embodiment, i.e., another charging rate adjusting circuit for cells in combination, comprises a timer circuit 46 wherein a one-shot IC 45 is provided, in place of the timer circuit 4 of the first embodiment comprising a CR circuit. A capacitor 43 and a resistor 44 are connected to the one-shot IC 45.

When a discharge command (high) is given to the primary side of the photocoupler 5 from the control system (not shown), the secondary side of the photocoupler 5 conducts to feed a trigger signal to the one-shot IC 45 of the timer circuit 46. In response to this signal, the one-shot IC 45 prepares a control pulse signal which becomes high only for a specified period of time in accordance with a time constant determined by the capacitor 43 and the resistor 44, and feeds the pulse signal to the gate of the on-off switch 3. This closes the switch 3 for the specified period of time only, causing the discharge resistor 2 to discharge the cell module 11.

Even if the supply of power to the control system connected to the photocoupler 5 is discontinued, with the on-off switch 3 closed, for example, for maintenance, the output pulse signal of the one-shot IC 45 becomes low upon lapse of the specified period of time to thereby automatically open the switch 3 to discontinue discharging. This obviates the likelihood that the cell module will be continuously discharged nearly to zero capacity.

Further according to the present embodiment, even if the gate voltage for closing the switch 3 involves variations, the duration of closing of the switch 3 is determined by the time constant of the capacitor 43 and resistor 44 which are connected to the one-shot IC 45, so that the discharge time can be controlled accurately. Further in the event of absence of the discharge stop command input owing to some fault, the discharging is discontinued accurately upon lapse of the specified period of time after the start of discharge. This eliminates the likelihood that the charging rate of the cell module 11 will reduce to an extremely low level.

What is claimed is:

1. A charging rate adjusting circuit for discharging electrochemical storage battery cells, of a cell combination comprising cell modules each comprising one or a plurality of cells and connected in series, the adjusting circuit being adapted to discharge at least one specified cell module among the plurality of cell modules in response to a discharge command so as to make uniform the plurality of cell modules connected to one another in series in charging rate or voltage, the charging rate adjusting circuit comprising a respective cell-discharge circuit connected to opposite electrodes of each of the cell modules, and a control circuit for controlling the operation of the discharge circuit, the control circuit comprising:
opening-closing means for opening or closing the discharge circuit, and
control means for holding the discharge circuit closed for a predetermined period of time to discharge the cell and keeping the discharge circuit open after the discharge circuit is opened, both in response to a discharge command.

2. A charging rate adjusting circuit according to claim 1 wherein the discharge circuit comprises a pair of discharge lines extending from the opposite electrodes of the cell module, and a discharge resistor provided between the pair of discharge lines.

3. A charging rate adjusting circuit according to claim 2 wherein the opening-closing means of the control circuit comprises an on-off switch connected in series with the discharge resistor, and the on-off switch changes from the open state to the closed state in response to a closing control signal from the control means.

4. A charging rate adjusting circuit according to claim 3 wherein the opening-closing means of the control circuit changes from the closed state to the open state in response to an opening control signal from the control means.

5. A charging rate adjusting circuit according to claim 3 wherein the control means of the control circuit comprises a capacitance element chargeable with the electric power of the cell module and thereafter dischargeable to apply a voltage serving as the closing control signal to the on-off switch approximately for a specified period of time, and a control element for connecting the capacitance element to the cell module in response to the discharge command to charge the capacitance element.

6. A charging rate adjusting circuit according to claim 3 wherein the control means of the control circuit comprises a control signal generating circuit capable of generating the closing control signal with the electric power of the cell module over the predetermined period of time and feeding the closing control signal to the on-off switch, and a control element for initiating the control signal generating circuit into operation in response to the discharge command.

7. A charging rate adjusting circuit according to claim 1, comprising a control system generating a respective discharge command for each cell-discharge circuit.

* * * * *